US009653076B2

(12) United States Patent
Kim

(10) Patent No.: US 9,653,076 B2
(45) Date of Patent: May 16, 2017

(54) DISPLAY DEVICE FOR CONVERTING VOICE TO TEXT AND METHOD THEREOF

(71) Applicant: LG ELECTRONICS INC., Seoul (KR)

(72) Inventor: Jihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 649 days.

(21) Appl. No.: 13/740,847

(22) Filed: Jan. 14, 2013

(65) Prior Publication Data

US 2014/0163983 A1   Jun. 12, 2014

(30) Foreign Application Priority Data

Dec. 10, 2012   (KR) .................. 10-2012-0143006

(51) Int. Cl.
   *G10L 15/00*   (2013.01)
   *G10L 15/26*   (2006.01)
   *G06F 3/16*   (2006.01)

(52) U.S. Cl.
   CPC .............. *G10L 15/26* (2013.01); *G06F 3/167* (2013.01)

(58) Field of Classification Search
   USPC .................. 704/235, 246, 247, 251, 252
   See application file for complete search history.

(56) References Cited

U.S. PATENT DOCUMENTS

| 5,581,783 | A | 12/1996 | Ohashi |
| 6,438,523 | B1 | 8/2002 | Oberteuffer et al. |
| 8,543,394 | B2 * | 9/2013 | Shin ...................... G06F 1/1624 |
| | | | 704/231 |
| 2005/0283364 | A1 | 12/2005 | Longe et al. |
| 2009/0306980 | A1 | 12/2009 | Shin |
| 2011/0085211 | A1 * | 4/2011 | King et al. .................... 358/474 |
| 2011/0276327 | A1 * | 11/2011 | Foxenland .................... 704/235 |
| 2012/0078627 | A1 | 3/2012 | Wagner |
| 2012/0098835 | A1 | 4/2012 | Sorihashi |
| 2012/0173236 | A1 | 7/2012 | Huang et al. |
| 2012/0297308 | A1 * | 11/2012 | Anikul et al. ................ 715/738 |
| 2012/0306772 | A1 * | 12/2012 | Tan ..................... G06F 3/04842 |
| | | | 345/173 |

(Continued)

FOREIGN PATENT DOCUMENTS

WO   WO 2007/053294 A1   5/2007
WO   WO 2012/162895 A1   12/2012

*Primary Examiner* — Leonard Saint Cyr
(74) *Attorney, Agent, or Firm* — Birch, Stewart, Kolasch & Birch, LLP

(57) ABSTRACT

A display device for converting a voice to a text and displaying the converted text and a method thereof are disclosed. The display device comprises a storage unit configured to store the voice data; a display unit configured to display the text; a sensor unit configured to detect a user input to the display unit; and a processor configured to convert the voice data to the text and display the converted text in the display unit, wherein the processor provides a text preview interface displaying at least a part of the text in the display unit, in response to a first user input, and provides a text output interface displaying the text in the display unit, in response to a second user input, and the text output interface displays the text in accordance with the second user input.

20 Claims, 16 Drawing Sheets

(56) References Cited

U.S. PATENT DOCUMENTS

2013/0024189 A1\* 1/2013 Kim ................... G10L 13/04
  704/201
2013/0063373 A1\* 3/2013 Roh ................ G06F 17/30905
  345/173

\* cited by examiner

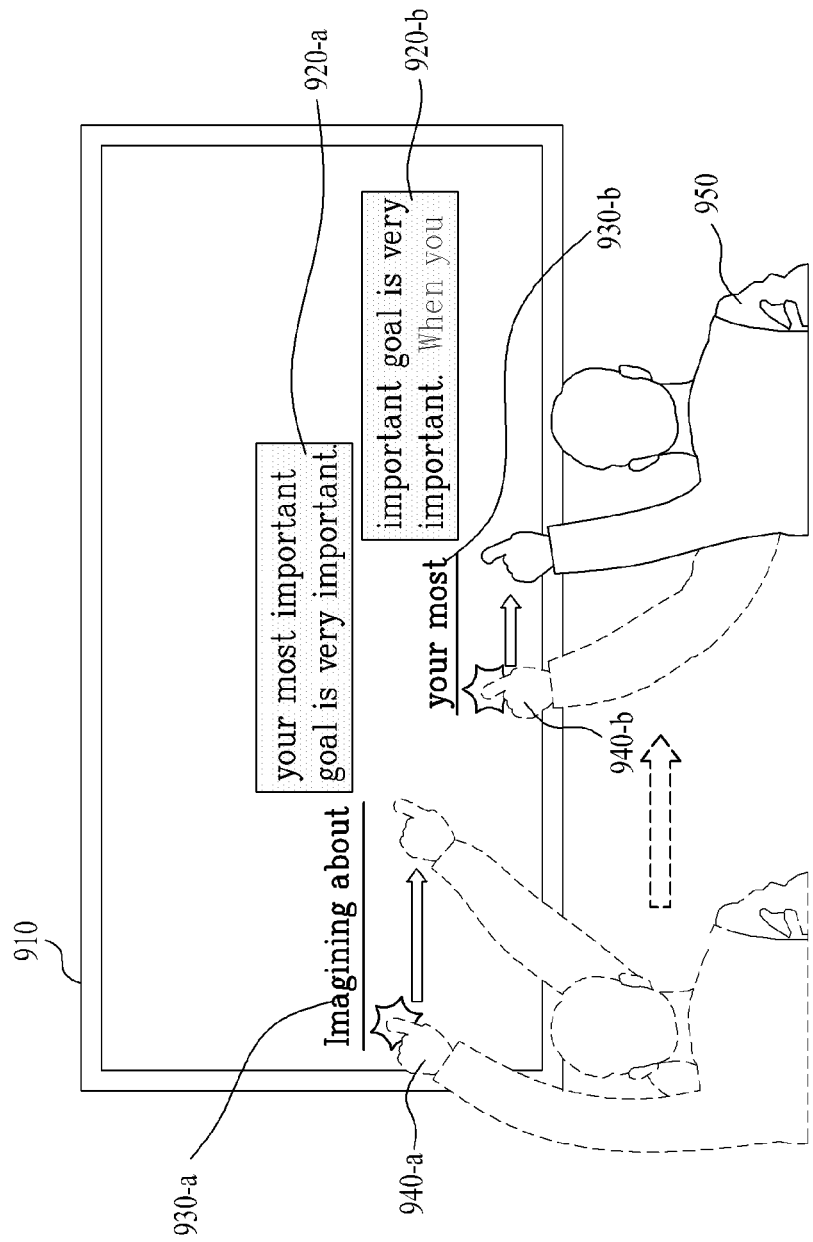

DISPLAY DEVICE FOR CONVERTING VOICE TO TEXT AND METHOD THEREOF

This application claims the benefit of the Korean Patent Application No. 10-2012-0143006, filed on Dec. 10, 2012, which is hereby incorporated by reference as if fully set forth herein.

BACKGROUND OF THE INVENTION

Field of the Invention

The present specification relates to a display device for converting voice to text and a method thereof, and more particularly, to a method for converting voice data to text and displaying the converted text.

Discussion of the Related Art

In accordance with the development of information technology, to increase convenience of users, a voice-text conversion technology based on a digital device has been popularized. For example, a text which is displayed could be read out by a computer voice through a text-to-voice conversion program. Also, a digital device could covert a voice to a text through a voice-to-text conversion program and display the converted text. As a result, a user utters a voice towards the digital device, the digital device may recognize a voice and convert the recognized voice to a text, whereby the user may send a text message to another user.

Meanwhile, a speaker speaks with writing a desired message on the blackboard during lecture or announcement. However, writing of a desired message of the speaker on the blackboard may reduce a speed of writing or readability. Also, the speaker speaks simultaneously with writing, it may be difficult for the speaker to concentrate on lecture or announcement. Accordingly, a simple method for converting a voice of a speaker to a text and displaying the converted text will be required.

SUMMARY OF THE INVENTION

Accordingly, the present specification is directed to a display device for converting voice to text and a method thereof, which substantially obviate one or more problems due to limitations and disadvantages of the related art.

An object of the present specification is to provide a display device for converting voice to text and a method thereof, in which a speaker easily displays a lecture message in the display device without directly writing. In this case, the present specification is intended that a user previously identifies a displayed text and edits the text to display a desired text in a text output interface.

Another object of the present specification is to provide a display device for converting voice to text and a method thereof, in which a message of a user is easily displayed in the display device through simple touch input if the size of the display device is greater than the writing range of the user.

Other object of the present specification is to provide a display device for converting voice to text and a method thereof, in which a user may easily edit a text which is desired to be displayed as a text preview interface and a text output interface are easily converted.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a display device for converting voice data to a text comprises a storage unit configured to store the voice data; a display unit configured to display the text; a sensor unit configured to detect a user input to the display unit; and a processor configured to convert the voice data to the text and display the converted text in the display unit, wherein the processor provides a text preview interface displaying at least a part of the text in the display unit, in response to a first user input, and provides a text output interface displaying the text in the display unit, in response to a second user input, and the text output interface displays the text in accordance with the second user input, and an amount of the text displayed in the text output interface is determined on the basis of a predetermined output font size and a length of the second user input.

In another aspect of the present specification, a method of controlling a display device for converting voice data to a text comprises the steps of converting the voice data to the text; detecting a first user input; providing a text preview interface displaying at least a part of the text in response to the first user input; detecting a second user input; and providing a text output interface displaying the text, in response to the second user input, wherein the output interface displays the text in accordance with the second user input, and the amount of the text displayed in the text output interface is determined on the basis of a predetermined output font size and a length of the second user input.

According to one embodiment of the present specification, since the received voice data may be converted to the text and displayed by the user input, the user may concentrate on lecture or announcement without separate writing for the audience.

Also, according to one embodiment of the present specification, since the user may previously identify the text which will be displayed, through the preview interface and then display the text, unnecessary texts may be deleted and important texts may be displayed efficiently.

Also, according to one embodiment of the present specification, since the user may easily convert the text preview interface and the text output interface, the user may conveniently edit the text already displayed or the text which will be displayed.

Also, according to one embodiment of the present specification, since the text may be displayed in various manners such as a straight line and a curved line through various user inputs, the audience may be interested in the text.

Finally, according to one embodiment of the present specification, since the display device may display the text in a region where it is difficult for the hand of the user to reach, through a touch input, convenience of the user may be increased.

More detailed advantageous effects will be described hereinafter.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiments of the specification and together with the description serve to explain the principle of the specification. In the drawings.

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Moreover, although the embodiments of the present specification will be described with reference to the accompanying drawings and the disclosure of the accompanying drawings, it is to be understood that the present specification is not limited by the embodiments.

Figure 1:
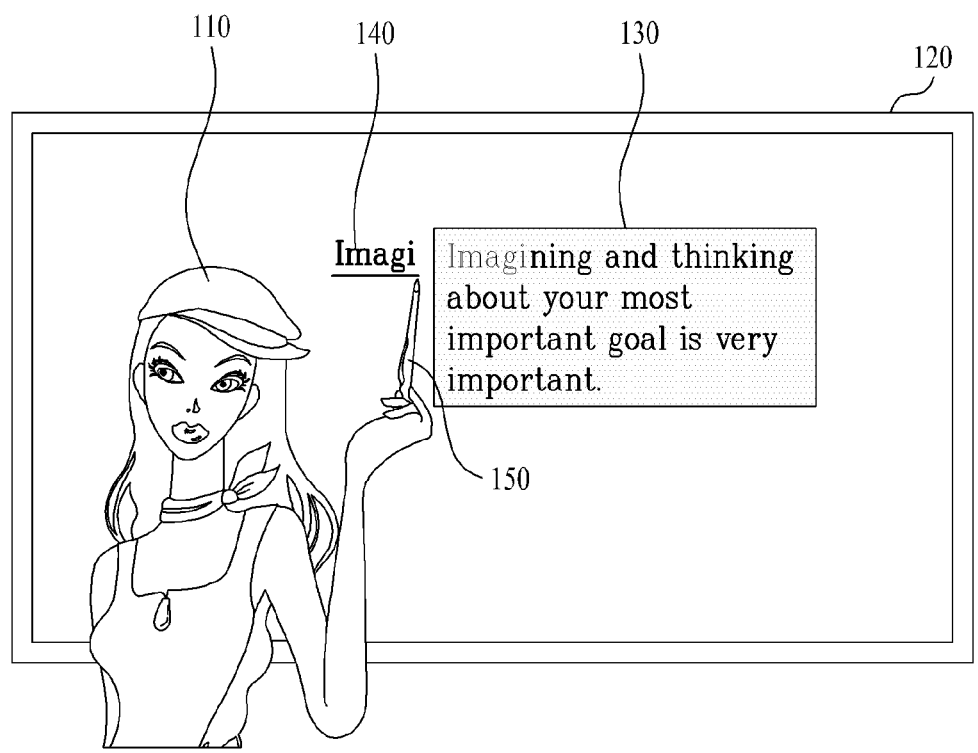
FIG. 1 is a diagram illustrating that voice data are converted to text data and displayed in accordance with one embodiment of the present specification.

FIG. 1 is a diagram illustrating that voice data are converted to text data and displayed in accordance with one embodiment of the present specification. In more detail, FIG. 1 illustrates that a display device 120 converts voice data to text data and displays the converted text.

The display device 120 may display the converted text through a text preview interface 130 and a text output interface 140. The text preview interface 130 corresponds to a preview of the text converted from the voice data received by the display device. The display device 120 provides the text preview interface 130, and a user may edit the text, which will be displayed in the text output interface 140 through the text preview interface 130, whereby a necessary text only may be displayed. Also, the text output interface 140 corresponds to a case where the display device 120 displays the converted text in response to the input of the user 110. For example, the text output interface 140 may display the converted text in accordance with the input of the user 110 to the display device 120, that is, in a position corresponding to the input of the user 110.

For example, referring to FIG. 1, the display device 120 may convert the voice data to the text. In this case, the voice data may include voice received directly by the display device 120 or voice provided from an external device (not shown) to the display device 120. Next, the display device 120 may display at least a part of the converted text in the text preview interface 130. For example, the display device 120 may provide the text preview interface 130 in response to the input of the user 110. In this case, the input of the user 110 may include touch input and hovering input. Also, the display device 120 may display the converted text in the text output interface 140 in response to the input of the user 110. In this case, the display device 120 may detect the input of the user 110 through an input means 150. For example, the input means 150 may include touch input through a finger and touch input through a pen.

Figure 2:
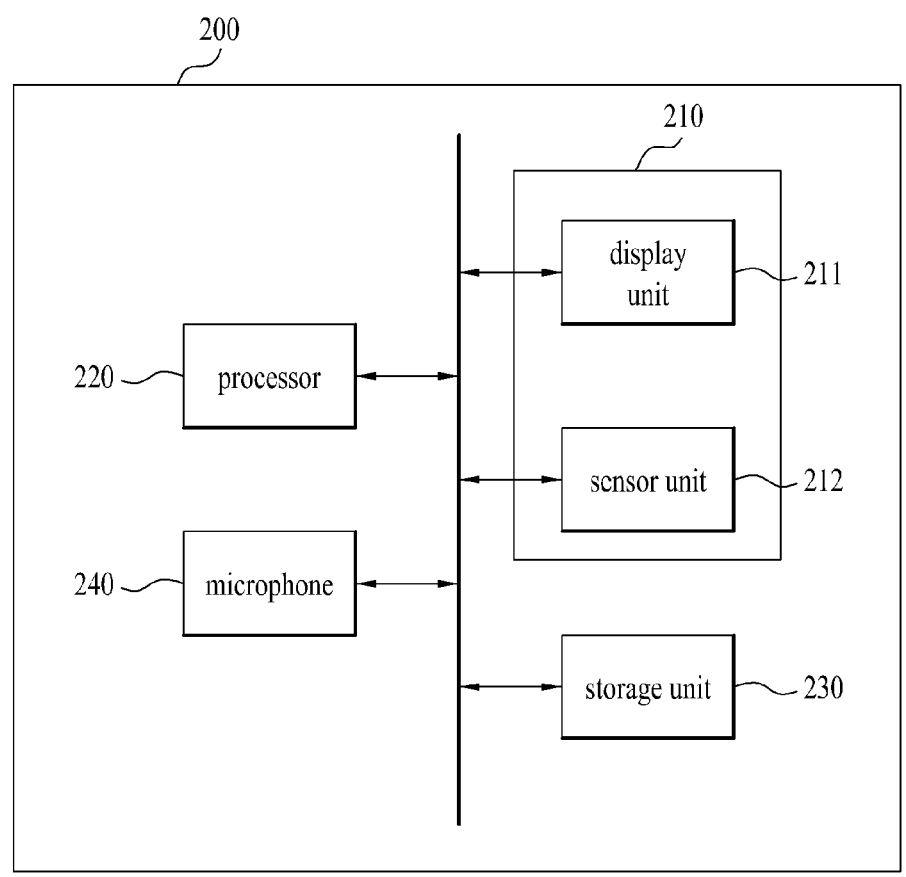
FIG. 2 is a block diagram illustrating a display device for converting a voice to a text.

FIG. 2 is a block diagram illustrating a display device for converting a voice to a text. Referring to FIG. 2, the display device 200 may include a touch screen 210, a processor 220, a storage unit 230 and a microphone 240. In this case, the display device 200 may include various digital devices that may display a text. For example, the display device 200 may include a PC, a personal digital assistant (PDA), a notebook computer, a tablet PC, and a TV.

First, if a touch input of a hand of a user or a touch input of an object is sensed at a specific position on a screen without a separate keyboard, the touch screen 210 identifies the position and allows data to be input thereon. Accordingly, the touch screen 210 may include a display unit 211 and a sensor unit 212.

The display unit 211 may output text or image on a display screen. For example, the display unit 211 may display a graphic image, which includes texts or pictures, in response to the touch input of the user. Also, the display unit 211 may display a graphic image in various manners in response to the touch input of the user. Moreover, the display unit 211 may output text or images on the basis of a control command of the processor 220.

The sensor unit 212 may sense the user input by using a plurality of sensing means provided in the display device 200. Also, the sensor unit 212 refers to various sensing means, and may sense various inputs of the user and the user's environment and forward the sensed result to the processor 220 to perform the operation based on the sensed result.

According to one embodiment, the sensor unit 212 may detect the user input to the display unit 211 and transmit a control signal corresponding to the detected user input to the processor 220. For example, the sensor unit 212 may include a touch sensor. The touch sensor may sense a touch of a hand of a user or a touch of an object and a screen, identify the sensed position and transmitted the identified result to the processor 220. In this case, the touch sensor may sense a simple touch, a long touch, a touch and drag, a multi-touch, etc. The simple touch is that a hand of a user or an object directly touches the screen. The long touch is that a touched state of the hand of the user or the object with respect to the screen continues. The touch and drag includes a drag operation in a state that the hand of the user or the object touches the screen. Also, the multi-touch is that the hand of the user or the object touches at least two positions of the screen. The multi-touch may be performed in such a manner that the hand of the user or the object touches at least two positions of the screen simultaneously or sequentially.

According to another embodiment, the sensor unit 212 may include a plurality of sensing means. For example, the plurality of sensing means may include a gravity sensor, a terrestrial magnetism sensor, a motion sensor, a gyro sensor, an acceleration sensor, an infrared sensor, an inclination sensor, a brightness sensor, an altitude sensor, a smell sensor, a temperature sensor, a depth sensor, a pressure sensor, a bending sensor, an audio sensor, and a global positioning system (GPS) sensor. Also, the sensor unit 212 may sense hovering by using the plurality of sensing means. Hovering means that the hand of the user or the object does not touches the screen directly but stays at a certain distance from the point to be touched. The aforementioned sensors may be included in the display device 200 as separate elements or may be incorporated into at least one or more elements.

The processor 220 may execute various contents and applications and process data inside the display device 200. For example, the processor 220 may convert voice to text and display the converted text in the display unit 211. In this case, the voice converted to text may include voice received in real time or voice stored previously. The processor 220 may display a text preview interface, which displays at least a part of the converted text, through the display unit 211 in response to the user input. Also, the processor 220 may display a text output interface, which displays the converted text, through the display unit 211 in response to the user input. Also, the processor 220 may provide a trigger interface for providing a text preview interface. The operation performed by the processor 220 will be described in more detail with reference to FIG. 3 to FIG. 13.

The storage unit 230 may store various digital data such as video, audio, photos, moving pictures, and applications. The storage unit 230 may include various digital data storage areas, such as a flash memory, a random access memory (RAM), an electrically erasable programmable read-only memory (EEPROM), and a solid state drive (SSD). According to one embodiment, the storage unit 230 may temporarily store voice data received through a microphonemicrophone 240 or voice data received from an external device (not shown). At this time, the storage unit 230 may be used for buffering for outputting the text converted from the received voice data through the display unit 211. The storage unit 230 may store a program for signal processing and control in the processor 220, or may store the signal processed video, audio or data signals.

The microphonemicrophone 240 may receive voice. Also, the microphone 240 may receive voice and provide the received voice data to the processor 220.

Figure 3A:
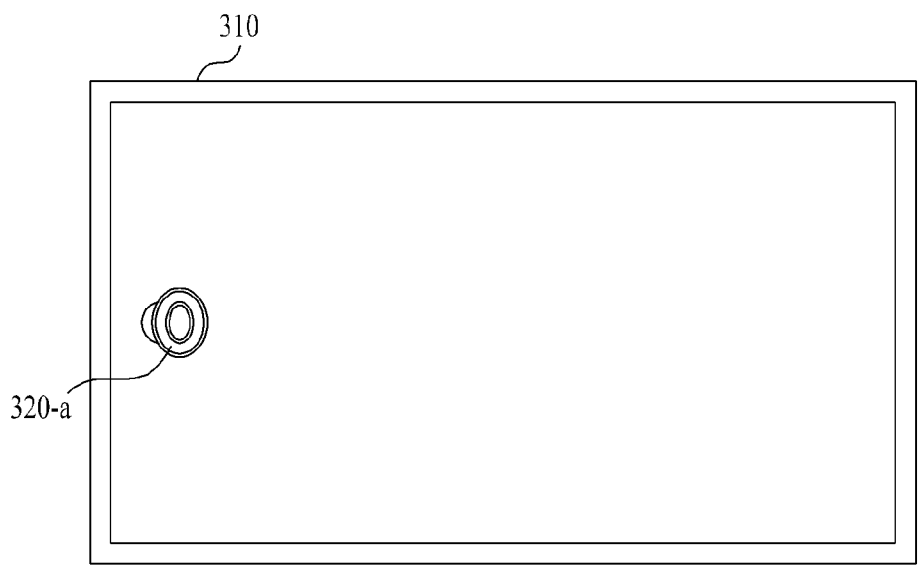
FIGS. 3A-3B are diagrams illustrating a trigger interface according to one embodiment of the present specification.
Figure 3B:
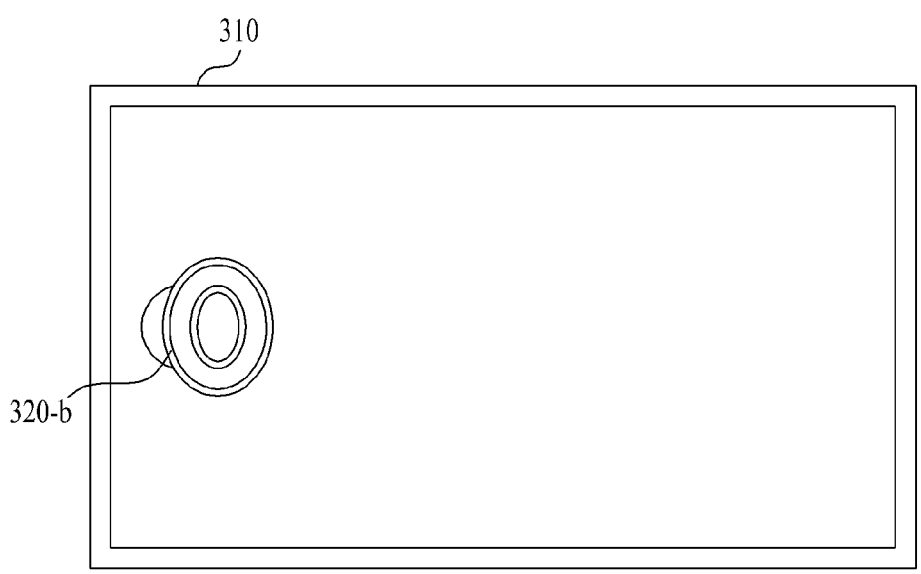

FIG. 3 is a diagram illustrating a trigger interface according to one embodiment of the present specification. In more detail, FIG. 3 illustrates that a display device 310 provides a trigger interface 320 indicating that a text converted from voice data exists. For example, the trigger interface 320 may be provided in the form of a speaker icon, a microphone icon, etc. Also, the position where the trigger interface 320 is displayed in the display device 310 may include a position automatically set in the display device 310 or a position selected by a user. At this time, the position automatically set in the display device 310 may correspond to one of lower, upper, left and right sides of the user input.

For example, a plurality of text data converted from voice data exist in the display device 310, the display device 310 may display a plurality of trigger interfaces. For another example, the display device 310 may determine the size of the trigger interface 320 on the basis of the size of the stored voice data or the amount of the converted text. According to one embodiment, referring to FIG. 3, a trigger interface 320-a has a size smaller than that of a trigger interface 320-b. This may indicate the case where the trigger interface 320-b has voice data stored in the display device 310, which is greater than that of the trigger interface 320-a, that is, has the amount of the converted text data more than that of the trigger interface 320-a.

As described above, if the display device according to one embodiment of the present specification provides the trigger interface, the user may easily recognize that the text converted from the voice data through the trigger interface exists in the display device.

FIG. 4 is a diagram illustrating a text preview interface according to one embodiment of the present specification. In more detail, FIG. 4 illustrates that a display device 410 detects a user input 440 and displays a text preview interface 430 in response to the user input 440.

Figure 4A:
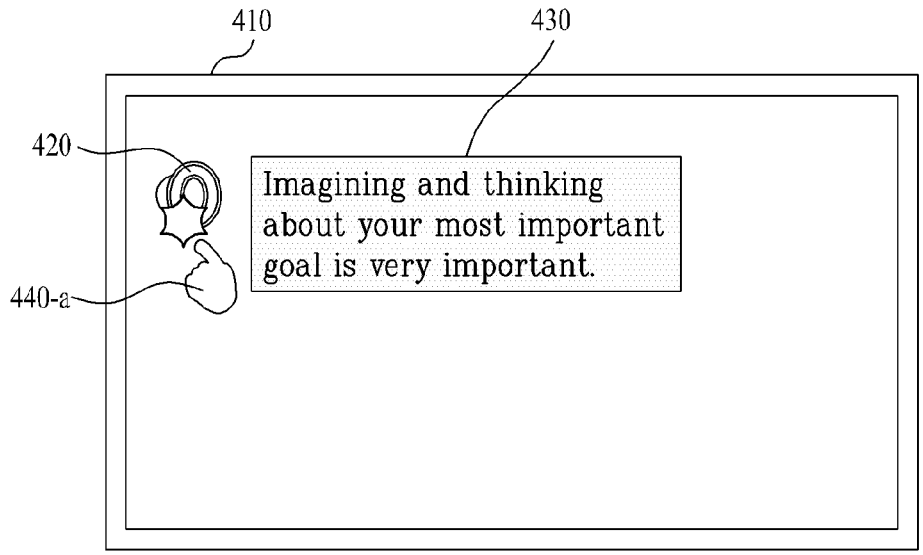
FIGS. 4A-4B and FIG. 5 are diagrams illustrating a text preview interface according to one embodiment of the present specification.

First, referring to FIG. 4(a), the display device 410 may detect a user input 440-a to the trigger interface 420, and may provide the text preview interface 430 in response to the detected user input 440-a. At this time, the sensor unit shown in FIG. 2 may detect the user input 440-a. In more detail, the touch sensor may detect the user input 440-a. In this case, the user input 440-a may include a touch input to the display device 410. For example, the touch input may include a touch, a long touch, and a multi-touch. Also, the display device 410 may display the text preview interfaced 430 at one of lower, upper, left and right sides of the user input 440-a. For example, in FIG. 4(a), the display device 410 may display the text preview interface 430 at the right side of the user input 440-a. Meanwhile, the display device 410 may delete the provided text preview interface 430 if the detected user input 440-a is not maintained continuously.

Figure 4B:
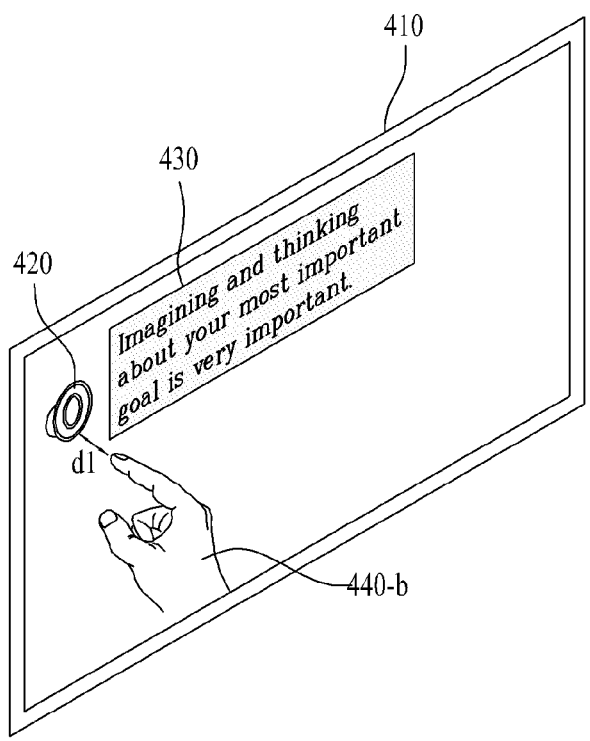

Also, referring to FIG. 4(b), the display device 410 may detect a user input 440-b to the trigger interface 420, and may provide the text preview interface 430 in response to the user input 440-b. At this time, the sensor unit shown in FIG. 2 may detect the user input 440-b. In this case, the user input 440-b may include hovering input. Also, the user input 440-b may include an input through a hand and an input through a pen. In other words, in FIG. 4(b), if the user input 440-b exists in a predetermined distance d1 from the trigger interface 420 displayed in the display device 410, the display device 410 may recognize the user input 440-b as hovering input. Accordingly, the display device 410 may provide the text preview interface 430 when it recognizes that the user input 440-b exists in the predetermined distance d1 from the trigger interface 420 displayed in the display device 410. Next, the display device 410 may continue to maintain the text preview interface 430 therein when it recognizes that the user input 440-b continues to exist in the predetermined distance d1 from the display device 410. On the other hand, the display device 410 may not provide the text preview interface 430 when it recognizes that the user input 440-b does not exist in the predetermined distance d1 from the display device 410.

As described above, if the display device according to one embodiment of the present specification detects the user input and provides the text preview interface in response to the user input, the user may display the text preview interface from the display device in various manners.

Figure 5:
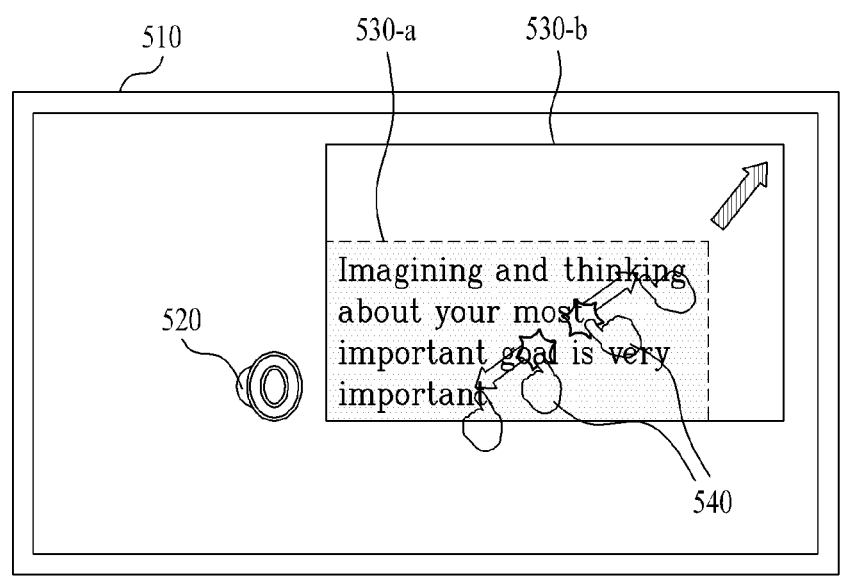

FIG. 5 is a diagram illustrating a text preview interface according to one embodiment of the present specification. In more detail, FIG. 5 illustrates that a display device 510 detects a user input 540 and controls a size of a text preview interface 530 in response to the user input 540.

Referring to FIG. 5, the display device 510 may provide a text preview interface 530-a in response to a user input to a trigger interface 520. Also, the display device may control a size of the text preview interface 530-a in response to the user input 540 to the text preview interface 530-a. In this case, the user input 540 may include a multi-touch, a touch and drag, etc. For example, the display device 510 may provide a text preview interface 530-b of which size is enlarged, in response to a touch and drag input based on two fingers towards the outside of the display device 510. In this case, the enlarged text preview interface 530-b may have the increased amount of the text or an increased preview font size of the text as compared with the text preview interface 530-a. Also, for example, the display device 510 may provide a text preview interface 530-a of which size is reduced, in response to the touch and drag input based on two fingers towards the inside of the display device 510. In this case, the reduced text preview interface 530-a may have the reduced amount of the text or an increased preview font size of the text as compared with the text preview interface 530-b.

As described above, if the size of the text preview interface is controlled in the display device according to one embodiment of the present specification, the user may easily recognize the text displayed in the text preview interface through text amount control or font size control.

FIG. 6 is a diagram illustrating that a text preview interface deletes a displayed text in accordance with one embodiment of the present specification. In more detail, FIG. 6 illustrates that a text preview interface 620 is displayed in a display device 610 and a text displayed in the text preview interface 620 is deleted in response to a user input 630.

Figure 6A:
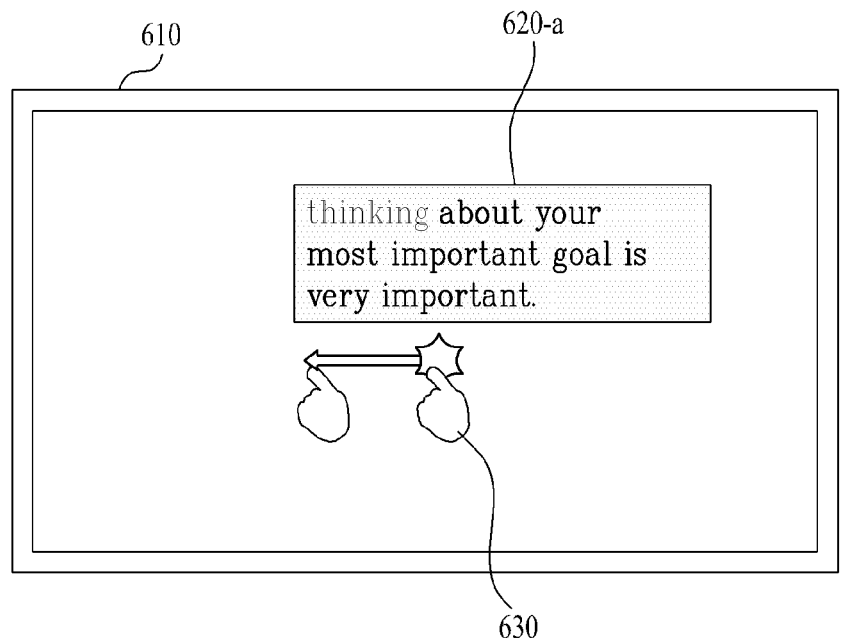
FIGS. 6A-6B are diagrams illustrating that a text preview interface deletes a displayed text in accordance with one embodiment of the present specification.
Figure 6B:
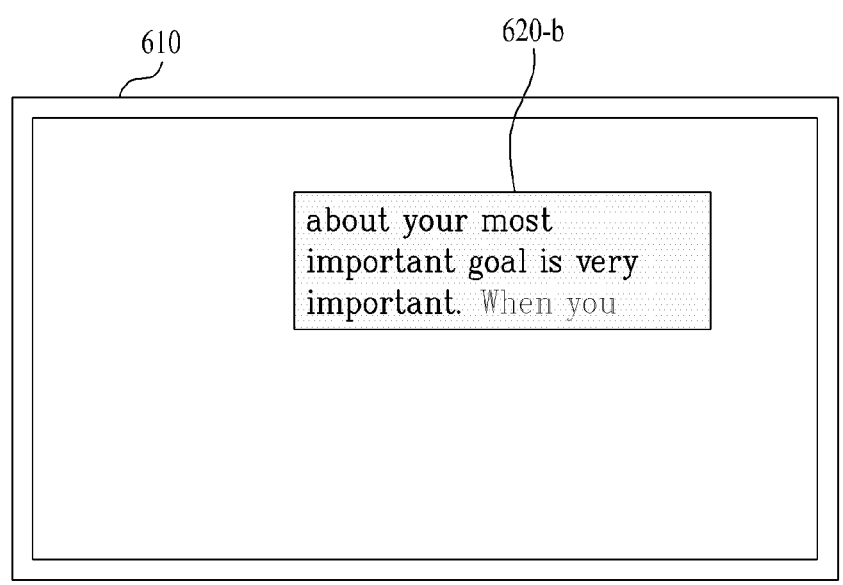

Referring to FIG. 6(a), the display device 610 may detect a user input 630 of the text preview interface 620. In this case, the user input 630 may include a touch input and a hovering input. Next, the display device 610 may delete at least a part of the text displayed in the text preview interface 620 in response to the user input 630. In this case, the amount of the deleted text may be determined on the basis of the predetermined preview font size and a length of the user input 630. For example, the predetermined preview font size may correspond to the preview font size automatically set in the display device 610 or the preview font size set by the user. Also, the direction of the user input 630 to the text preview interface 620 may correspond to the direction substantially the same as that of a user input in FIG. 13, which will be described later. In other words, the user input 630 may correspond to the direction substantially opposite to that of a user input of FIG. 8, which will be described later. According to FIG. 6(a), the display device 610 may delete 'thinking' of the text displayed in a text preview interface 620-a, in response to the user input 630. Meanwhile, the display device 610 may detect the user input 630 to the position corresponding to the text to be deleted, from the text preview interface 620-a. According to FIG. 6(a), the display device 610 may detect the user input 630 to the position corresponding to 'thinking' from the text preview interface 620-a.

According to one embodiment of the present specification, the display device 610 may delete the text from the text preview interface 620 and at the same time display next text of the displayed text. In other words, in FIG. 6(b), the display device may display 'When you' which is next text of the text displayed in the text preview interface 620-b from which 'thinking' has been deleted. In this way, if the display device deletes the text from the preview interface and at the same time displays next text, the user may quickly recognize and edit the text which will be displayed in the display device.

FIG. 7 is a diagram illustrating editing mode conversion of a text preview interface and a text output interface in accordance with one embodiment of the present specification. In more detail, FIG. 7 illustrates that a display device 710 detects a user input 750 and a text output interface 740 converts an editing mode to a text preview interface in response to the detected user input 750. Also, the display device 710 may detect the user input 750 and convert the editing mode from the text preview interface 720 to the text output interface 740 in response to the detected user input 750.

Figure 7A:
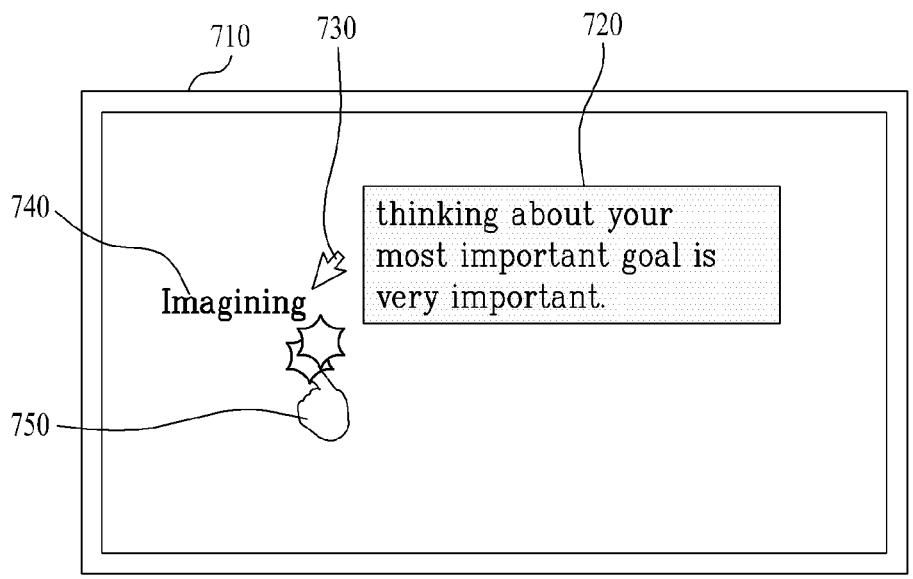
FIGS. 7A-7B are diagrams illustrating editing mode conversion of a text preview interface and a text output interface in accordance with one embodiment of the present specification.

First, the display device 710 may detect the user input 750. In this case, the user input 750 may include a multi-touch and a long touch. Also, the user input 750 may be located inside the display device 710, and is not needed to be located inside the text preview interface 720 or the text output interface 740. In this case, the display device may determine the editing mode of the text preview interface 720 or the editing mode of the text output interface 740 on the basis of a position of a cursor 730. Referring to FIG. 7(a), since the cursor 730 is located in the text output interface 740, the display device 710 may recognize the editing mode of the text output interface 740.

Figure 7B:
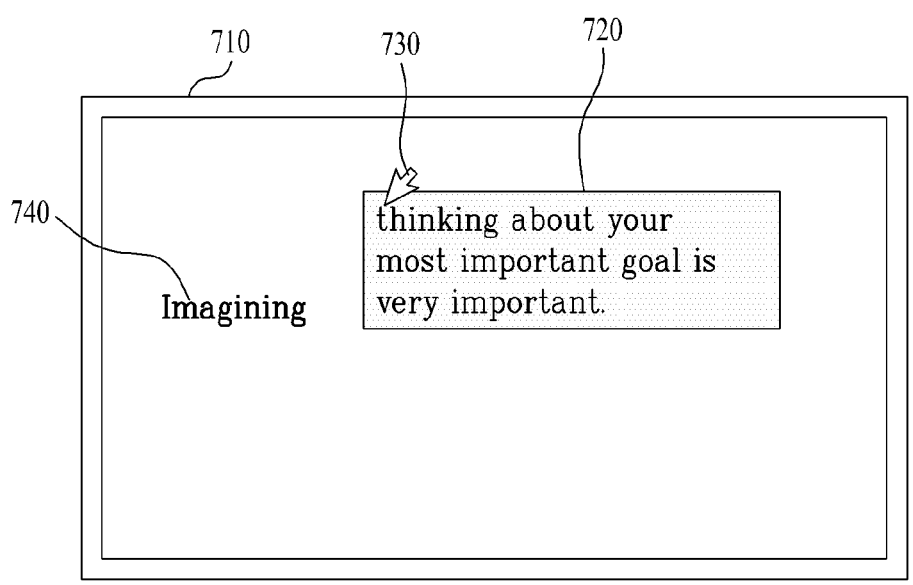

Next, the display device 710 may convert the editing mode of the text preview interface 720 or the text output interface 740 in response to the user input 750. Referring to FIG. 7(b), since the cursor 730 is located in the text preview interface 720, the display device may recognized that the editing mode has been converted to the editing mode of the text preview interface 720. Meanwhile, although not shown in FIG. 7, the opposite case of FIG. 7 may occur.

Figure 8A:
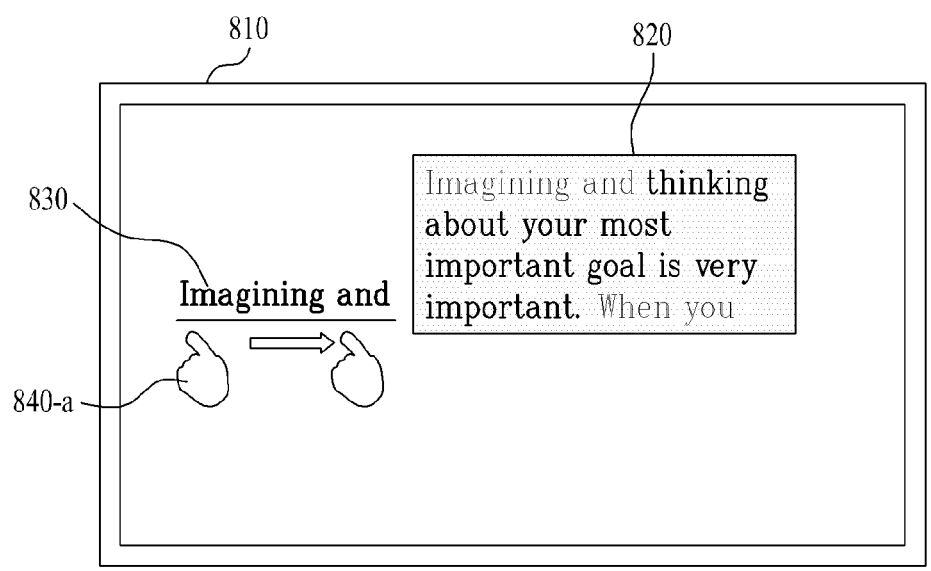
FIGS. 8A-8B to FIG. 12 are diagrams illustrating a text output interface according to one embodiment of the present specification.
Figure 8B:
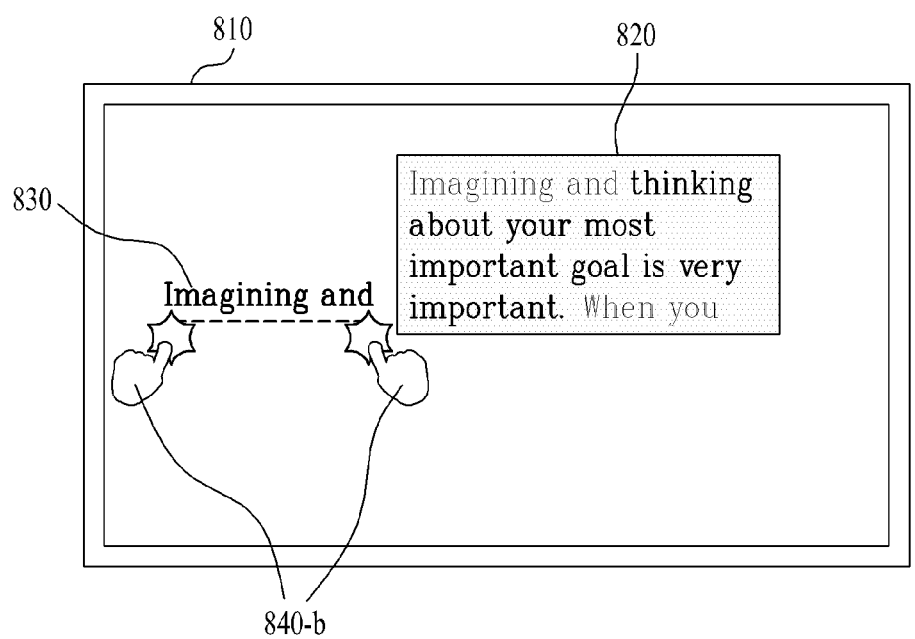

FIG. 8 is a diagram illustrating a text output interface according to one embodiment of the present specification. In more detail, FIG. 8 illustrates that a display device 810 detects a user input 840 and displays a text in a text output interface 830 in response to the user input 840.

First, the display device 810 may detect the user input 840. In this case, the user input 840 may include a touch and drag and a multi-touch. Next, the display device 810 may display the text in the text output interface 830 in response to the detected user input 840. In this case, the direction of the user input 840 may be determined on the basis of the direction which is predetermined in the display device 810. For example, the direction of the user input 840 for displaying the text may correspond to a right direction. For example, the display device 810 may display the text displayed in the text preview interface 820 in accordance with a time sequence for voice reception. This is because that the text displayed in the text preview interface 820 is displayed in accordance with a time sequence for voice reception of the display device 810. Referring to FIG. 8(a), the display device 810 may display 'Imaging and', which is located ahead in accordance with the time sequence for voice reception, among the text displayed in the text preview interface 820, in the text output interface 830. For another example, the display device 810 may display a text set by selection of the user, among the text displayed in the text preview interface 820, in the text output interface 830. Referring to FIG. 8(*a*), if it is set to display 'most important goal' of the text displayed in the text preview interface 820 in accordance with selection of the user, the display device 810 may display 'most important goal' in the text output interface 830.

For another example, if the text output interface 830 displays the text displayed in the text preview interface 820, the display device 810 may display next text of the text displayed in the text output interface 830, in the text preview interface 820. Referring to FIGS. 8(*a*) and 8(*b*), if 'Imaging and' is extracted from the text displayed in the text preview interface 820 and displayed in the text output interface 830, the display device 810 may display 'thinking about . . . ' which is next portion of 'Imaging and' which is the text displayed in the text output interface 830, in the text preview interface 820.

For another example, if the text output interface 830 displays the text displayed in the text preview interface 820, the display device 810 may additionally display the amount corresponding to the text displayed in the text output interface 830, in the text preview interface 820. Referring to FIGS. 8(*a*) and 8(*b*), if 'Imaging and' of the text displayed in the text preview interface 820 is displayed in the text output interface 830, the display device 810 may display 'When you' which is the amount corresponding to 'Imaging and' displayed in the text output interface 830, in the text preview interface 820.

For another example, the amount of the text displayed in display device 810 may be determined on the basis of a predetermined output font size and a length of the user input. The predetermined output font size may correspond to the output font size automatically set in the display device 810 or the output font size set by the user. For example, if the user input 840 is a touch and drag, the amount of the text displayed in the display device 810 may be determined on the basis of a distance of a line formed by the user input and the predetermined output font size. In this case, the line formed by the user input 840 may include transparent, opaque and semi-transparent lines. Also, in this case, the distance of the line formed by the user input 840 may include a straight distance or a curved distance. Referring to FIG. 8(*a*), the display device 810 may display 'Imaging and' in the text output interface 830 on the basis of the straight distance of the line formed by the user input 840-*a* and the predetermined output font size. Also, for example, if the user input 840 is a multi-touch, the amount of the text displayed in the display device 810 may be determined on the basis of the straight distance of the line formed by the user input 840 and the predetermined output font size. In this case, the multi-touch may include simultaneous touch and sequential touch. Referring to FIG. 8(*b*), the display device 810 may display 'Imaging and' in the text output interface 830 on the basis of the straight distance among multi-touch points formed by the user input 840-*b* and the predetermined output font size.

In the meantime, the display device 810 may provide different graphic effects to the text preview interface 820 and the text output interface 830. For example, the display device 810 may provide color, shade and light and darkness of the text preview interface 820 and the text output interface 830 differently. This is to allow the user to identify the text preview interface 820 from the text output interface 830. Also, for example, the display device 810 may display the text preview interface 820 semi-transparently and display the text output interface 830 opaquely. Also, for example, the display device 810 may provide the output font size greater than the preview font size. This is to allow the text output interface 830 to have visibility higher than that of the text preview interface 820 as the text preview interface 820 corresponds to the interface provided for preview to the user.

Also, if the user input 840 is not maintained continuously, the display device 810 may maintain the text displayed in the text output interface and delete the provided text preview interface 820. Referring to FIGS. 8(*a*) and 8(*b*), if the user input 840 is not maintained continuously, the display device 810 may delete the text 'Imaging and' displayed in the text output interface 830 and delete the provided text preview interface 820.

FIG. 9 is a diagram illustrating a text output interface according to one embodiment of the present specification. In more detail, FIG. 9 illustrates that a display device 910 detects a discontinuous user input 940 and displays a text in a text output interface 930 in response to the detected user input 940.

Referring to FIG. 9, the display device 910 may detect a first user input 940-*a* and display a text 'Imaging about' in a first text output interface 930-*a* in response to the detected first user input 940-*a*. In this case, the amount of the text displayed in the first text output interface 930-*a* may be determined on the basis of a predetermined output font size and a length of the first user input 940-*a*. At this time, the display device 910 may display 'your most important goal is very important' corresponding to next sequence of 'Imaging about' in the first text preview interface 920-*a*.

Next, the display device 910 may detect a second user input 940-*b* which is a continuous user input to the first user input 940-*a*. The discontinuous user input 940 may correspond to the case where the first user input 940-*a* and the second user input 940-*b* are discontinuous spatially or temporally. Then, the display device 910 may display the text 'your most' in the second text output interface 930-*b* in response to the detected second user input. In this case, the texts displayed in the first text output interface 930-*a* and the second text output interface 930-*b* may correspond to continuous texts.

In the meantime, if the text is displayed in the second text output interface 930-*b* in response to the second user input 940-*b*, next text of the text displayed in the second text output interface 930-*b* may be displayed in the second text preview interface 920-*b*. Referring to FIG. 9, 'important goal is very important. When you' which is next text of the text 'your most' may be displayed in the text preview interface 920 at the time when the text 'your most' is displayed in the second text output interface 930-*b*.

Figure 10:
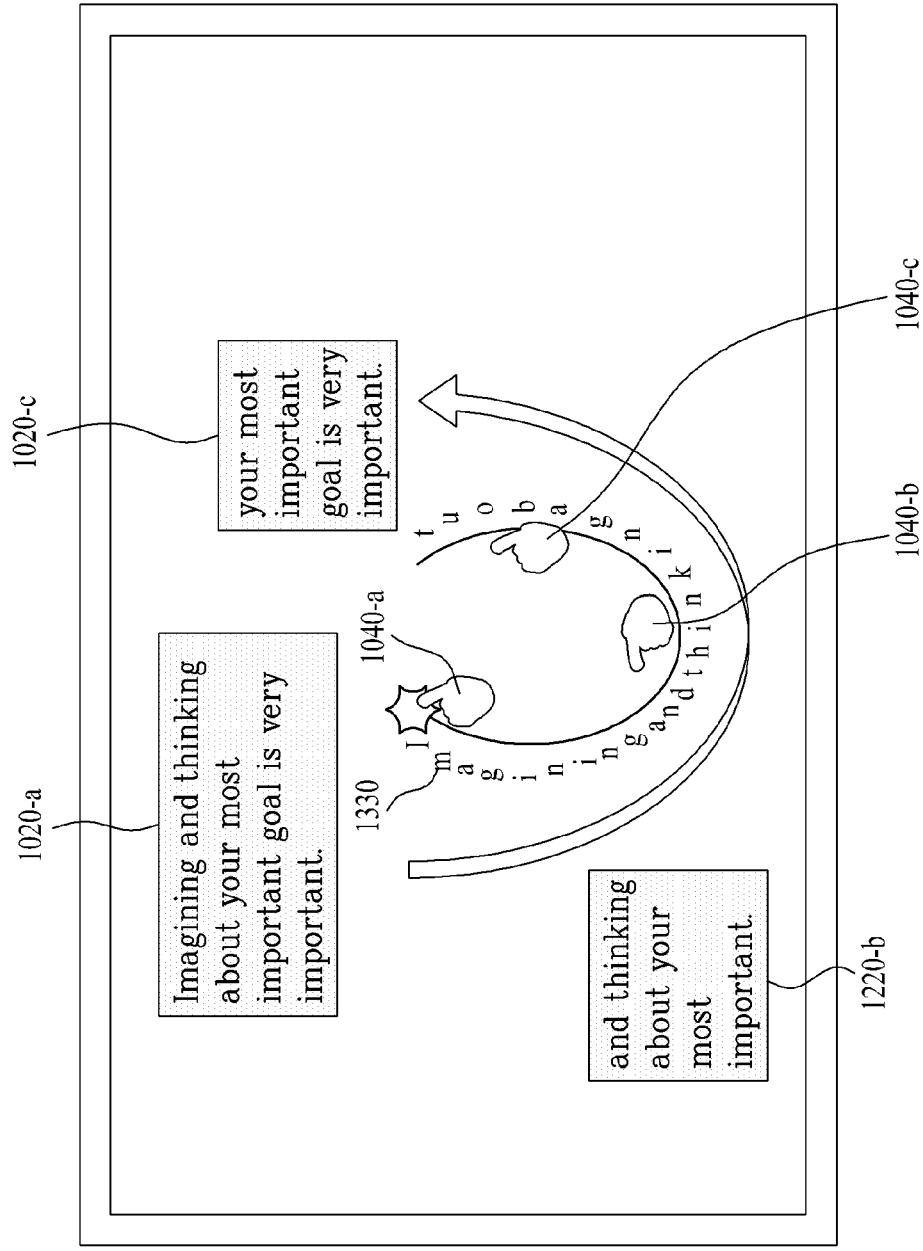

FIG. 10 is a diagram illustrating a text output interface according to one embodiment of the present specification. In more detail, FIG. 10 illustrates that a display device 1010 detects a user input 1040 that forms a curved line, and displays a text in a text output interface 1030 in response to the detected user input 1040.

First, the display device 1010 may detect the user input 1040 that forms a curved line. In this case, the user input 1040 may include a long touch and a touch and drag. Also, a type of the user input 1040 may include a straight line or a curved line. Next, the display device 1010 may display a text in the text output interface 1030 in response to the detected user input 1040. For example, the display device 1010 may sequentially display texts in the text output interface 1030 along the curved line formed by the user input 1040. Also, the display device 1010 may delete the texts displayed in the text output interface 1030 among the texts displayed in the text preview interface 1020 along the curved line formed by the user input 1040.

Referring to FIG. 10, the display device 1010 may display 'Imaging and thinking about your most important goal is very important.' in the first text preview interface 1020-*a* in response to the first user input 1040-*a*. In this case, the first user input 1040-*a* may correspond to an initial touch input for forming a curved line. Next, the display device 1010 may display 'Imaging' in the text output interface 1030, which forms a curved line, in response to the second user input 1040-*b* that forms a curved line. In this case, the text displayed on the curved line may be determined on the basis of a predetermined output font size and a length of the curved line formed by the user input 1040. Also, the display device 1010 may display 'and thinking about your most important' in a second text preview interface 1020-*b* in response to the second user input 1040-*b* that forms a curved line. In this case, the text displayed in the second text preview interface 1020-*b* may correspond to next text of the text displayed in the text output interface 1030. Also, the display device 1010 may control a size of the text preview interface 1020-*b* by considering a position and a size.

Next, the display device 1010 may display 'and thinking about' in the text output interface 1030, which forms a curved line, in response to a third user input 1040-*c* that forms a curved line. Also, the display device 1010 may display 'your most important goal is very important' in a third text preview interface 1020-*c* in response to the third user input 1040-*c* that forms a curved line. In this case, the text displayed in the third text preview interface 1020-*c* may correspond to next text of the text displayed in the text output interface 1030.

Figure 11:
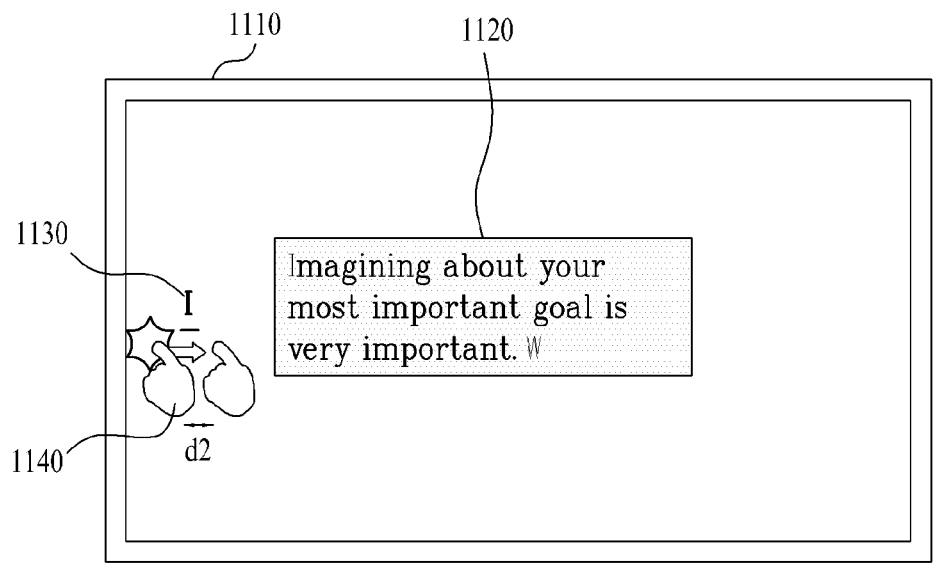

FIG. 11 is a diagram illustrating a text output interface according to one embodiment of the present specification. In more detail, FIG. 11 illustrates that a display device 1110 detects a user input 1140 and displays a text in a text output interface 1130 in a unit of character in response to the detected user input 1140.

First, the display device 1110 may detect the user input 1140. In this case, the user input 1140 may correspond to a touch and drag. Next, if a length of the detected user input 1140 exceeds a width of a predetermined output font size, the display device 1110 may display the text in the text output interface 1130 in a unit of character. Referring to FIG. 11, when the length of the user input 1140 exceeds a width d2 of the output font size, the display device 1110 may display a character 'I' in the text output interface 1130. Also, if the text is displayed in the text output interface 1130 in a unit of character, the display device 1110 may delete a text displayed in a text preview interface 1120 in a unit of character and display next text in a unit of character. Referring to FIG. 11, if the character 'I' is displayed in the text output interface 1130, the display device 1110 may delete 'I' from the text preview interface 1120 and display next character 'W'. Accordingly, the display device 1110 may continue to display the text in a unit of character whenever the length of the user input 1140 exceeds the width d2 of the output font size.

Figure 12:
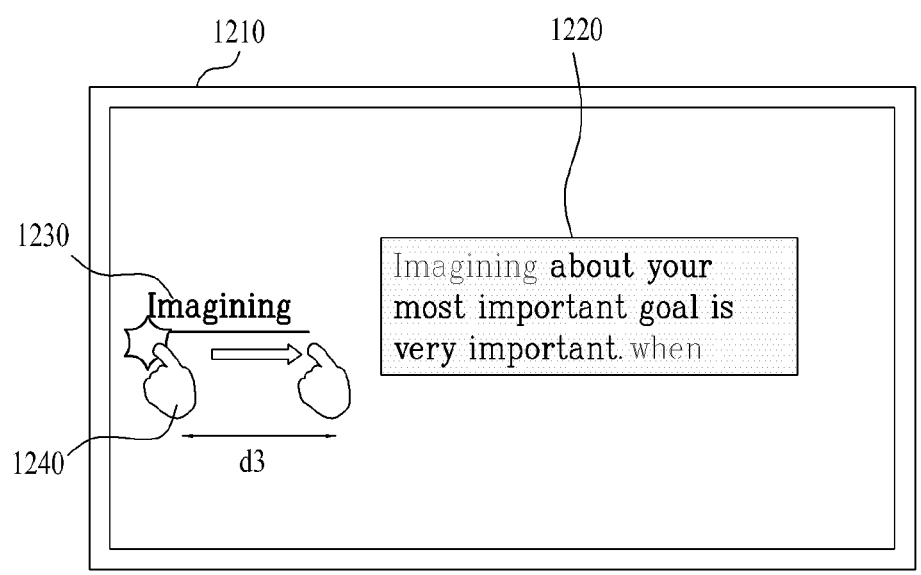

FIG. 12 is a diagram illustrating a text output interface according to one embodiment of the present specification. In more detail, FIG. 12 illustrates that a display device 1210 detects a user input 1240 and displays a text in a text output interface 1230 in a unit of word in response to the detected user input 1240.

First, the display device 1210 may detect the user input 1240. Next, if a length of the detected user input 1240 exceeds a predetermined length, the display device 1210 may display the text in the text output interface 1230 in a unit of word. Referring to FIG. 12, if the length of the user input 1240 exceeds a predetermined length d3, the display device 1210 may display a word 'Imaging' in the text output interface 1230. For example, a length of a word is longer than the predetermined length d3, the display device 1210 may detect the user input 1240 in a unit of the predetermined length d3 until the length of the user input 1240 becomes longer than the length of the word, and may display the word in the text output interface 1230 in accordance with the user input 1240. Also, if the text is displayed in the text output interface 1230 in a unit of word, the display device 1210 may delete a text displayed in a text preview interface 1220 in a unit of word and display next text in a unit of word. Referring to FIG. 12, if the word 'Imaging' is displayed in the text output interface 1230, the display device 1210 may delete 'Imaging' from the text preview interface 1220 and display next word 'When'. Accordingly, the display device 1210 may continue to display the text in a unit of word whenever the length of the user input 1240 exceeds the predetermined length d3.

Figure 13:
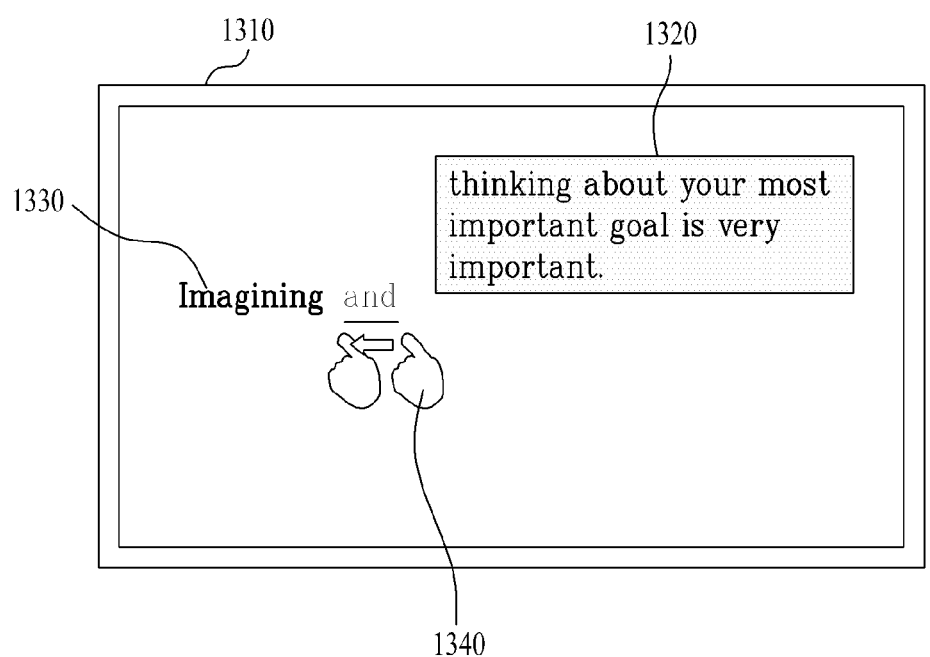
FIG. 13 is a diagram illustrating that a text displayed in a text output interface is deleted in accordance with one embodiment of the present specification.
Figure 14A:
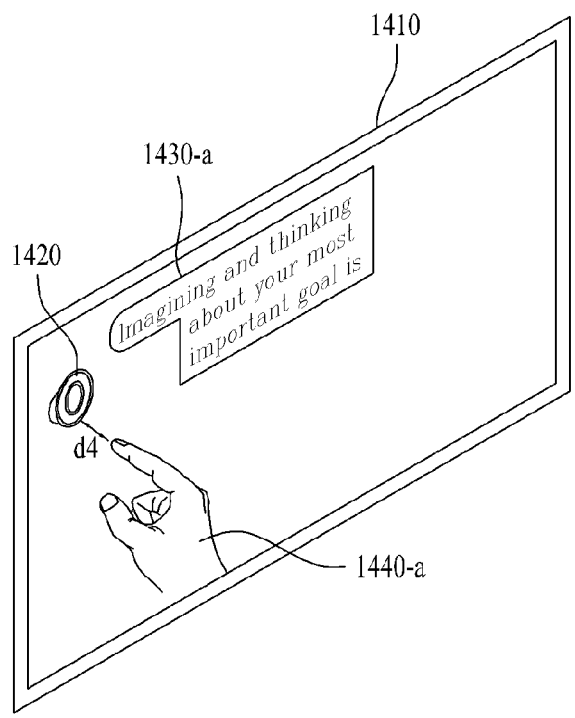
FIGS. 14A-14D are diagrams illustrating a text preview interface and a text output interface according to one embodiment of the present specification.
Figure 14B:
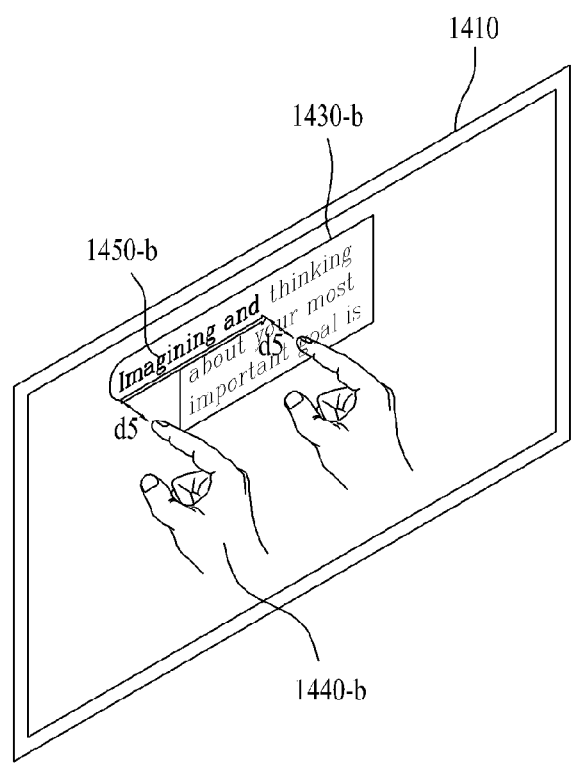
Figure 14C:
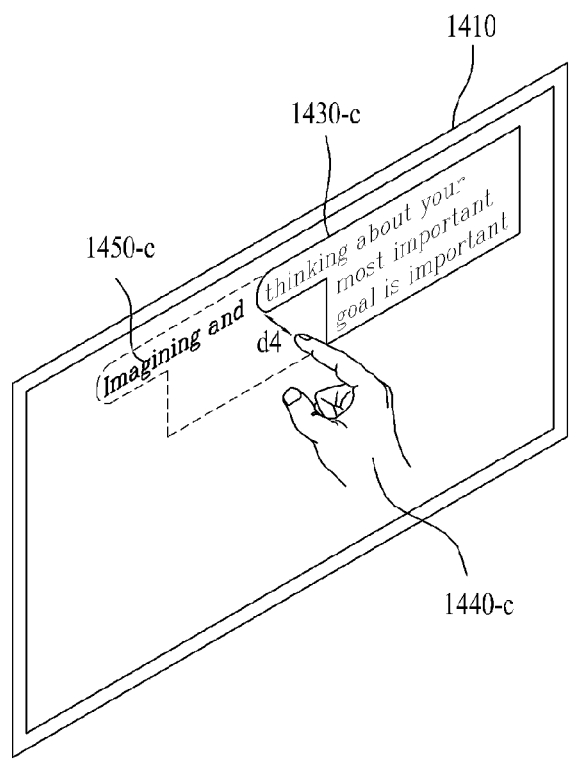
Figure 14D:
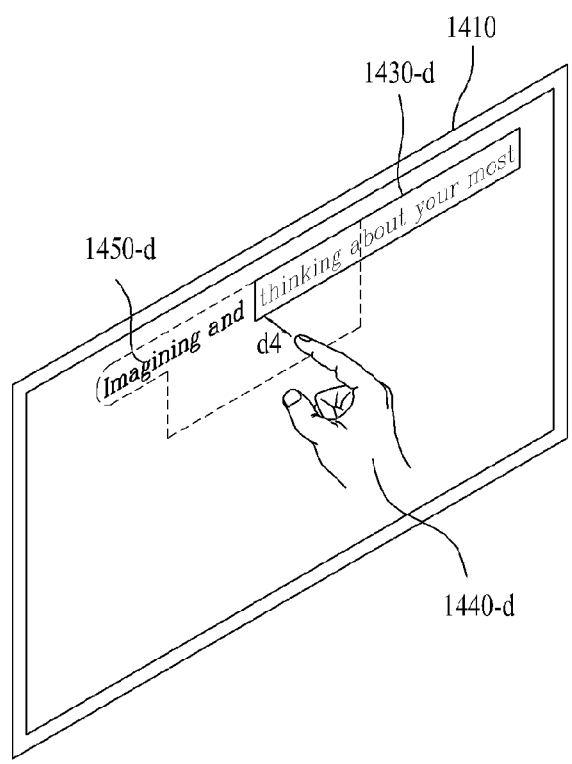

FIG. 13 is a diagram illustrating that a text displayed in a text output interface is deleted in accordance with one embodiment of the present specification. In more detail, FIG. 13 illustrates that a display device 1310 detects a user input 1340 and deletes a text displayed in a text output interface 1330 in response to the detected user input 1340.

First, the display device 1310 may detect the user input 1340. Next, the display device 1310 may delete the text displayed in the text output interface 1330 in accordance with the detected user input 1340. In this case, the amount of the deleted text may be determined on the basis of a predetermined output font size and a length of the user input 1340. The predetermined output font size may be the same as the output font size described in FIG. 8. Also, the user input 1340 may correspond to an input substantially opposite to the user input for displaying the text described in FIG. 8. Referring to FIG. 13, the display device 1310 may delete 'and' of the text displayed in the text output interface 1330.

FIG. 14 is a diagram illustrating a text preview interface and a text output interface according to one embodiment of the present specification. In more detail, FIG. 14 illustrates that a display device 1410 detects a user input 1440 that includes a hovering input, and provides a text preview interface 1430 and a text output interface 1450 in response to the detected user input 1440.

Referring to FIG. 14(*a*), the display device 1410 may detect a user input 1440-*a* to a trigger interface 1420. Next, the display device 1410 may provide a text preview interface 1430-*a* in response to the user input 1440-*a*. At this time, a type of the text preview interface 1430-*a* is a rectangular type, and may include a type indicated by a finger type extended from one side of the rectangular type. In this case, the extended type may display a first portion of a text of the text preview interface 1430-*a*. For example, in FIG. 14(*a*), the display device 1410 may provide the text preview interface 1430-*a* in response to the user input 1440-*a* within a predetermined distance d4 from the display device 1410.

Referring to FIG. 14(*b*), the display device 1410 may provide a text output interface 1450-*b* in response to a user input 1440-*b*. For example, the user input 1440-*b* may include a touch input to the display device 1410. In FIG. 14(*b*), the display device 1410 may detect a touch input and display 'Imaging and' on the basis of a predetermined output font size and a length of the touch input. For another example, the display device 1410 may include a hovering input within a predetermined distance d5 from the display device 1410. For example, the predetermined distance d5 from the display device 1410 may be shorter than the predetermined distance d4 illustrated in FIG. 14(*a*). In this case, if the display device 1410 detects the user input 1440-*b* within the predetermined distance d5, it may recognize an editing mode of a text preview interface 1430-*b*. Accordingly, in FIG. 14(*b*), the display device 1410 may detect the hovering input 1440-*b* and display the text 'Imaging and' on the basis of the predetermined output font size and a length of the hovering input. In this case, a direction of the user input 1440-*b* may correspond to a direction towards a right side.

In the meantime, the display device 1410 may provide a text output interface 1450-*b* at the same position as that of the text preview interface 1430-*b*. In more detail, the display device 1410 may maintain the position of the text preview interface 1430-*b* without change while the user input 1440-*b* is being performed. Accordingly, the display device 1410 may detect the user input 1440-*b* for the text output interface 1450-*b* on the text displayed in the text preview interface 1430-*b*. In this case, the display device 1410 may display the text by varying a graphic effect of the text corresponding to the user input 1440-*b* in a state that the text preview interface 1430-*b* is maintained. For example, the display device 1410 may opaquely display the text, which is semi-transparently displayed in the text preview interface 1430-*b*, in accordance with the user input 1440-*b*. Accordingly, the user may feel that the text displayed in the text preview interface 1430-*b* is displayed in the text preview interface 1450-*b*.

In the meantime, if the display device 1410 detects a hovering input beyond the predetermined distance d4 or the predetermined distance d5, it may recognize that the text preview interface 1430-*b* or the text output interface 1450-*b* ends. In this case, the display device 1410 may maintain the text already displayed in the text output interface 1450-*b* as it is but may not display the text displayed in the text preview interface 1430-*b*. For example, in FIG. 14(*b*), the display device 1410 may recognize the user input 1440-*b* beyond the predetermined distance d4 or the predetermined distance d5. In this case, the display device 1410 may maintain 'Imaging and' displayed in the text output interface 1450-*b* and may allow 'thinking about your most important goal is' displayed in the text preview interface 1430-*b* to disappear.

Also, referring to FIG. 14(*c*), after displaying the text in the text output interface 1450-*c*, if the display device 1410 detects a user input 1440-*c* at the predetermined distance d4, it may provide a text preview interface 1440-*c* of which position has been changed. In this case, the display device 1410 may display next text of the text, which is displayed in the text output interface 1450-*c*, in the text preview interface 1440-*c*. In FIG. 14(*c*), after displaying 'Imaging and' in the text output interface 1450-*c*, the display device 1410 may detect the user input 1440-*c* based on the hovering input. Next, the display device 1410 may display next text 'thinking about your most important goal is important' in the text preview interface 1430-*c* in response to the detected user input 1440-*c*.

Also, referring to FIG. 14(*d*), after displaying the text in a text output interface 1450-*d*, if the display device 1410 detects a user input 1440-*d* at the predetermined distance d4, it may provide another type text preview interface 1430. For example, the display device 1410 may provide a text preview interface 1430-*d* of which size and type have been changed. In FIG. 14(*d*), after displaying 'Imaging and' in the text output interface 1450-*d*, the display device 1410 may detect the user input 1440-*d* based on the hovering input.

Next, the display device 1410 may display next text 'thinking about your most' in the changed text preview interface 1430-*d* in response to the detected user input 1440-*d*. For example, the display device 1410 may display the text preview interface 1430 in a rectangular type that may display a text corresponding to the amount of one line in a state that a part of one side of the rectangular type is similar to a finger.

Figure 15:
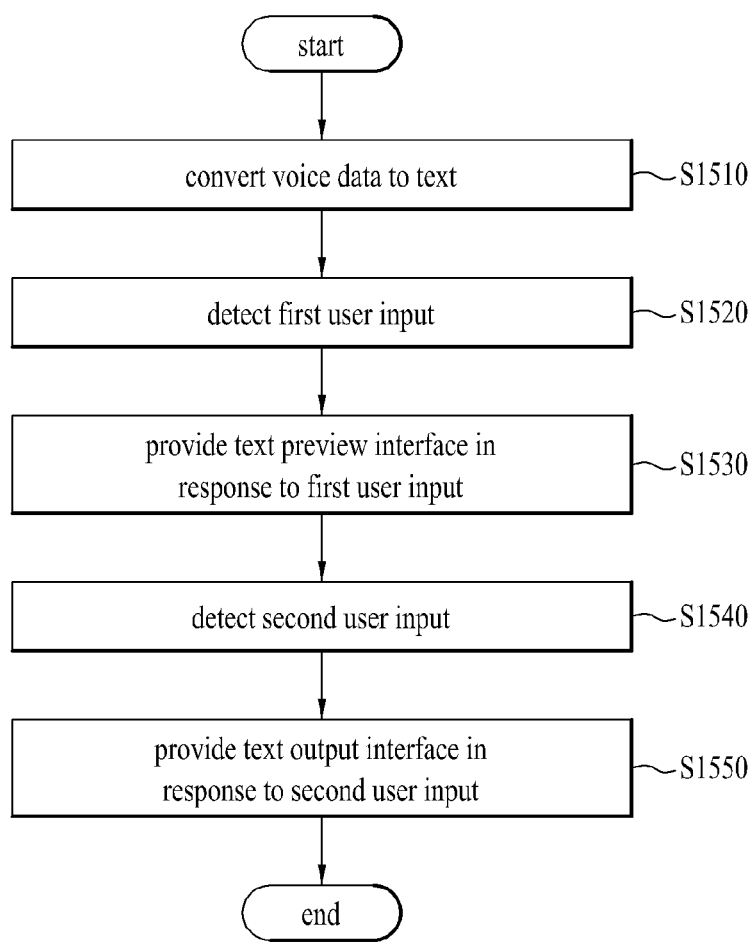
FIG. 15 and FIG. 16 are flow charts illustrating a method for converting a voice to a text.

FIG. 15 is a flow chart illustrating a method for converting a voice to a text. Each step of FIG. 15 may be controlled by the processor 220 of the display device 200 shown in FIG. 2.

First, the display device may convert voice data to a text (S1510). As described with reference to FIG. 1, the voice data may include voice received by the display device in real time or voice stored previously. Also, the voice data may include voice directly received by the display device or voice transferred from the external device. Also, the display device may display a trigger interface indicating that text data converted from the voice data exist.

Next, the display device may detect a first user input (S1520). In this case, the first input, as described with reference to FIG. 14, may include a simple touch, a long touch, a multi-touch, and a hovering input. For example, the display device may detect the first user input to the trigger interface.

Next, the display device may provide the text preview interface in response to the detected first user input (S1530). In this case, the text preview interface corresponds to a preview of the text data converted from the voice data received by the display device. As described with reference to FIG. 4, for example, the display device may display at least a part of the converted text data in the text preview interface in response to the first user input. For another example, the display device may provide the text preview interface in lower, upper, left and right sides of the first user input. Also, the display device may control the amount of the text displayed in the text preview interface, in accordance with a separate user input.

Next, the display device may detect a second user input (S1540). In this case, the second user input, as described with reference to FIG. 8, may include a hovering input, a touch and drag, and a multi-touch.

Next, the display device may provide the text output interface in response to the second user input (S1550). In this case, the text output interface corresponds to a case where the display device displays the converted text in accordance with the user input. As described with reference to FIG. 8, for example, the display device may display the text displayed in the text preview interface in response to a time sequence of voice reception. Also, if the text displayed in the text preview interface is displayed in the text output interface, the display device may display next text of the text, which is displayed in the text output interface, in the text preview interface. For another example, the display device may display a portion, which is selected by the user from the text displayed in the text preview interface, in the text output interface.

Also, if a length of the second user input exceeds a width of a predetermined output font size, the display device may display the text in the text output interface in a unit of character. Also, if the length of the second user input exceeds the width of the predetermined output font size, the display device may display the text in the text output interface in a unit of word.

In the meantime, the display device may provide different graphic effects to the text preview interface and the text output interface, respectively. In this case, the text preview interface and the text output interface may be displayed differently in at least one of color, shade, and light and darkness. For example, the display device may display the text preview interface semi-transparently and display the text output interface opaquely.

Figure 16:
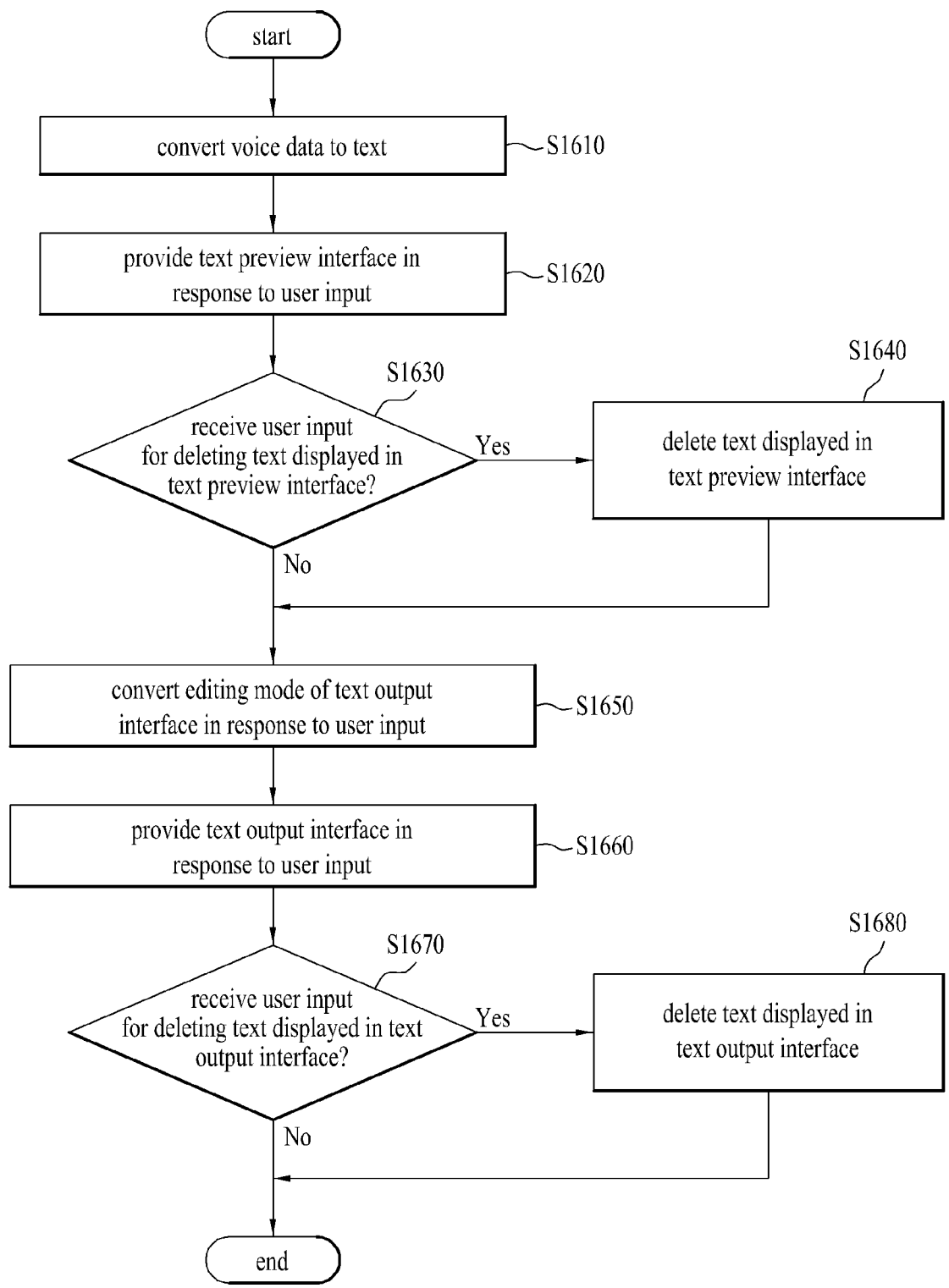

FIG. 16 is a flow chart illustrating a method for converting a voice to a text. Each step of FIG. 16 may be controlled by the processor 220 of the display device 200 shown in FIG. 2. Also, the detailed description of the embodiment of FIG. 16 the same as or corresponding to the embodiment of FIG. 15 will be omitted.

First, the display device may convert voice data to a text (S1610). For example, as described with reference to FIG. 3, the voice data may provide a trigger interface indicating that the text converted from the voice data exists. Next, the display device may provide the text preview interface in response to the user input (S1620). For example, the display device may provide the text preview interface, which displays at least a part of the converted text, in response to the user input to the trigger interface.

Next, if the display device detects a user input for deleting the text displayed in the text preview interface (S1630), it may delete the text displayed in the text preview interface, in accordance with the user input (S1640). As described with reference to FIG. 6, the amount of the text which is deleted may be determined on the basis of the predetermined preview font size and the length of the user input. For example, the predetermined preview font size may correspond to the preview font size automatically in the display device or the preview font size set by the user.

At the step S1630, if the display device does not detect the user input for deleting the text displayed in the text preview interface, it may convert the editing mode from the text preview interface to the text output interface in accordance with the user input (S1650). As described with reference to FIG. 7, the display device may determine the editing mode of the text preview interface or the editing mode of the text output interface on the basis of a position of a cursor. Also, the user input may include a multi-touch, a long touch, etc. Also, the user input may be located inside the display device, and is not required to be located inside the text preview interface or the text output interface.

Also, the display device may provide the text output interface 740 in accordance with the user input (S1660). Next, if the display device detects a user input for deleting the text displayed in the text output interface (S1670), it may delete the text displayed in the text output interface in accordance with the user input (S1680). As described with reference to FIG. 13, the amount of the text which is deleted may be determined on the basis of the predetermined output font size and the length of the user input. Also, the user input may correspond to the input opposite to the user input for displaying the text.

Moreover, although the description may be made for each of the drawings, the embodiments of the respective drawings may be incorporated to achieve a new embodiment. A computer readable recording medium where a program for implementing the embodiments is recorded may be designed in accordance with the need of the person skilled in the art within the scope of the present specification.

Also, the display device for converting a voice to a text and the method thereof according to the present specification are not limited to the aforementioned embodiments, and all or some of the aforementioned embodiments may selectively be configured in combination so that various modifications may be made in the aforementioned embodiments.

In the meantime, the method for converting a voice to a text according to the present specification may be implemented in a recording medium, which can be read by a processor provided in the network device, as a code that can be read by the processor. The recording medium that can be read by the processor includes all kinds of recording media in which data that can be read by the processor are stored. Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product specification and the method specification have been described, and description of both specifications may be made complementally if necessary.

What is claimed is:

1. A display device for converting voice data to a text the display device comprising:
 a storage unit configured to store the voice data;
 a display unit configured to display the text;
 a sensor unit configured to detect a touch input to the display unit; and
 a processor configured to:
 convert the voice data to the text,
 display the converted text in the display unit,
 display a text preview interface in response to a first touch input, wherein the text preview interface previews at least a part of the text converted from the voice data in the display unit,
 detect a second touch input, wherein the second touch input corresponds to drag touch input including a length,
 determine an amount of the text displayed in a text output interface based on a predetermined output font size and the length of the second touch input,
 display the text in the text output interface in response to the second touch input, wherein the text output interface displays the text which is a part of displayed the text preview interface in the display unit, and
 provide different graphic effects to the text preview interface from the text output interface when the text output interface is displayed.

2. The display device according to claim 1, wherein the processor displays the text displayed in the text preview interface, in the text output interface in accordance with a time sequence for voice reception.

3. The display device according to claim 2, wherein, when the text displayed in the text preview interface is displayed in the text output interface, the processor displays next text of the text displayed in the text output interface in the text preview interface.

4. The display device according to claim 1, wherein, when the length of the second touch input exceeds a width of the predetermined output font size in the text output interface, the processor displays the text in the display unit in a unit of character.

5. The display device according to claim 1, wherein, when the length of the second touch input exceeds a predetermined length in the text output interface, the processor displays the text in the display unit in a unit of word.

6. The display device according to claim 1, wherein the processor further provides a trigger interface that provides the text preview interface.

7. The display device according to claim 1, wherein the processor changes a position of the text preview interface on the basis of the position of the second touch input.

8. The display device according to claim 1, wherein, when a discontinuous touch input of the second touch input for providing the text output interface is detected, the processor displays next portion of the text displayed in the text output interface in response to a discontinuous touch input.

9. The display device according to claim 1, wherein the first touch input includes a hovering input.

10. The display device according to claim 1, wherein the processor further deletes the text displayed in the text preview interface in response to a third touch input, and
an amount of the text which is deleted is determined on the basis of a predetermined preview font size and a length of the third touch input.

11. The display device according to claim 10, wherein, when the text displayed in the text preview interface is deleted, the processor displays a text of the amount corresponding to the deleted text in next portion of the last text displayed in the text preview interface.

12. The display device according to claim 1, wherein the processor further deletes the text displayed in the text output interface in response to a fourth touch input, and
an amount of the text which is deleted is determined on the basis of the predetermined output font size and a length of the fourth touch input.

13. The display device according to claim 1, wherein the processor further converts an editing mode between the text output interface and the text preview interface in response to a fifth touch input.

14. The display device according to claim 1, wherein the processor further controls an area of the displayed text preview interface in response to a sixth touch input, and
wherein a size of a preview font size or the amount of the text displayed in the text preview interface is controlled on the basis of the area of the provided text preview interface.

15. The display device according to claim 1, wherein the processor displays the text preview interface semi-transparently, and displays the text output interface opaquely.

16. The display device according to claim 1, wherein the processor displays the text preview interface to one of lower, upper, left and right sides of the first touch input.

17. The display device according to claim 1, wherein the voice data correspond to voice received in real time or voice stored previously.

18. A display device for converting voice data to a text, the display device comprising:
a storage unit configured to store the voice data;
a display unit configured to display the text;
a sensor unit configured to detect a touch input to the display unit; and
a process configured to:
convert the voice data to the text,
display the converted text in the display unit,
display a text preview interface in response to a first touch input, wherein the text preview interface previews at least a part of the text converted from the voice data in the display unit,
detect a second touch input, wherein the second touch input corresponds to drag touch input including a length,
determine an amount of the text which is deleted from the text preview interface based on a predetermined preview font size and the length of the second touch input,
delete the text which is displayed in the text preview interface in response to the second touch input,
detect a third touch input, wherein the third touch input corresponds to drag touch input including a length,
determine an amount of the text displayed in a text output interface based on a predetermined output font size and the length of the third touch input,
display the text in the text output interface in response to the third touch input, wherein the text output interface displays the text which is a part of displayed the text preview interface in the display unit, and
provide different graphic effects to the text preview interface from the text output interface when the text output interface is displayed.

19. A method of controlling a display device for converting voice data to a text, the control method comprising:
converting, via a processor, the voice data to the text;
detecting a first touch input;
displaying, via a display unit, a text preview interface displaying at least a part of the text in response to the first touch input, wherein the text preview interface previews at least a part of the text converted from the voice data in the display unit;
detecting, via the processor, a second touch input, wherein the second touch input corresponds to a drag touch input including a length;
determining, via the processor, an amount of the text displayed in a text output interface based on a predetermined output font size and the length of the second touch input;
displaying the text in the text output interface in response to the second touch input, wherein the text output interface displaying the text which is a part of displayed the text preview interface in the display unit; and
providing, via the processor, different graphic effects to the text preview interface from the text output interface when the text output interface is displayed.

20. A method of controlling a display device for converting voice data to a text, the control method comprising:
converting, via a processor, the voice data to the text;
detecting a first touch input;
displaying, via a display unit, a text preview interface, in response to the first touch input, wherein the text preview interface previews at least a part of the text converted from the voice data in the display unit;
detecting, via the processor, a second touch input, wherein the second touch input corresponds to drag touch input including a length;
determining, via the processor, an amount of the text which is deleted from the text preview interface based on a predetermined preview font size and the length of the second touch input;
deleting the text displayed in the text preview interface in response to the second touch input, the text preview interface deleting the text in accordance with the second touch input;

detecting a third touch input, wherein the third touch input corresponds to drag touch input including a length;

determining, via the processor, an amount of the text displayed in a text output interface based on a predetermined output font size and the length of the third touch input;

displaying the text in the text output interface in response to the third touch input, the text output interface displaying the text in accordance with the third touch input, wherein the text output interface displays the text which is a part of displayed the text preview interface in the display unit; and providing, via the processor, different graphic effects to the text preview interface from the text output interface when the text output interface is displayed.

\* \* \* \* \*